United States Patent
Hosokawa

(10) Patent No.: US 8,651,266 B2
(45) Date of Patent: Feb. 18, 2014

(54) OIL SUPPLY DEVICE FOR CONVEYANCE DEVICE

(75) Inventor: Kouichiro Hosokawa, Selangor Darul Ehsan (MY)

(73) Assignee: Senju Metal Industry Co., Ltd., Tokyo (JP)

( * ) Notice: Subject to any disclaimer, the term of this patent is extended or adjusted under 35 U.S.C. 154(b) by 0 days.

(21) Appl. No.: 13/696,250

(22) PCT Filed: Nov. 16, 2011

(86) PCT No.: PCT/JP2011/076425
§ 371 (c)(1),
(2), (4) Date: Dec. 18, 2012

(87) PCT Pub. No.: WO2012/067154
PCT Pub. Date: May 24, 2012

(65) Prior Publication Data
US 2013/0126305 A1    May 23, 2013

(30) Foreign Application Priority Data

Nov. 19, 2010 (JP) .................................. 2010-258595

(51) Int. Cl.
*B65G 45/08* (2006.01)
(52) U.S. Cl.
USPC ............................................................ 198/500
(58) Field of Classification Search
USPC ....................... 198/493, 500; 184/15.1, 15.3
See application file for complete search history.

(56) References Cited

U.S. PATENT DOCUMENTS

| | | | | |
|---|---|---|---|---|
| 2,304,571 A | * | 12/1942 | Joa ................................ | 198/500 |
| 3,023,848 A | * | 3/1962 | Osterman ..................... | 198/500 |
| 3,124,237 A | * | 3/1964 | Schommer .................... | 198/500 |
| 3,878,735 A | * | 4/1975 | Preuss ........................... | 198/500 |
| 4,964,344 A | | 10/1990 | Robinson | |

(Continued)

FOREIGN PATENT DOCUMENTS

| | | |
|---|---|---|
| EP | 1521712 A1 | 4/2003 |
| JP | 54-40379 U | 3/1979 |

(Continued)

OTHER PUBLICATIONS

International Search Report for PCT/JP2011/076425 completed Feb. 6, 2012; mailed Feb. 14, 2012, 2 pages.

(Continued)

*Primary Examiner* — James R Bidwell
(74) *Attorney, Agent, or Firm* — Chernoff Vilhauer McClung & Stenzel LLP

(57) ABSTRACT

An oil supply device for a conveyance device, comprising a conveyance chain, an upper rail in which the chain travels and an oil supply device provided above the upper rail. A groove portion is provided at an inner surface side of the upper rail. An upper key member is positioned between the groove portion and the chain to support the upper portion of the chain. An oil supply hole, through which oil passes, is formed at a position of the upper rail which corresponds to a position above the upper key member. The oil, dropped from the oil supply device, passes through the oil supply hole of the upper rail and is applied to an upper surface of the upper key member. The oil applied to the upper surface of the upper key member is flown along the upper surface and the side surface thereof and supplied to the chain.

2 Claims, 10 Drawing Sheets

(56) References Cited

U.S. PATENT DOCUMENTS

| | | | |
|---|---|---|---|
| 5,186,280 A * | 2/1993 | Mattcheck | 198/500 |
| 6,591,968 B2 * | 7/2003 | Snell et al. | 198/493 |
| 7,455,170 B2 * | 11/2008 | Beauchamp | 198/500 |
| 2005/0000752 A1 | 1/2005 | Fleige | |

FOREIGN PATENT DOCUMENTS

| | | |
|---|---|---|
| JP | 57-167636 U | 10/1982 |
| JP | 11-157630 | 6/1999 |
| JP | 11-222310 | 8/1999 |
| JP | 2003 238062 A | 8/2003 |
| JP | 2009 161286 A | 7/2009 |

OTHER PUBLICATIONS

Extended European Search Report for European Patent Application No. 11 84 2277, completed Feb. 13, 2013, 8 pages.

* cited by examiner

OIL SUPPLY DEVICE FOR CONVEYANCE DEVICE

CROSS-REFERENCE TO RELATED APPLICATION

This is a national stage application filed under ±USC 371 based on International Application No. PCT/JP2011/076425 filed Nov. 16, 2011, and claims priority under 35 USC 119 of Japanese Patent Application No. 2010-258595 filed Nov. 19, 2010.

TECHNICAL FIELD

The present invention relates to an oil supply device for a conveyance device used for conveying printed circuit boards or the like in a soldering apparatus for soldering the boards. More specifically, it relates to the device for supplying the oil stably and certainly to a chain by disposing a transmission member between the chain and an oil supply section.

BACKGROUND

A soldering apparatus is used generally for soldering electronics parts to a printed circuit board. The soldering apparatus is generally classified into a reflow type and a flow type. The reflow type soldering apparatus is provided with a conveyance device for conveying the board and a tunnel-shaped reflow device body (muffle). In the inside of the reflow device body, there are a preliminary heating zone, a main heating zone and a cooling zone. A solder paste is printed on the printed circuit board with a metal mask and the electronics parts are mounted thereon. In the preliminary heating zone and the main heating zone, heated air then blows down to the board conveyed by the conveyance device to melt the solder of the solder paste and to fix the electronics parts and the like to electrodes of the board. In the cooling zone, the board heated in the preliminary heating zone and the main heating zone is cooled to be solidified. These sequence processes are for soldering the printed circuit board.

Here, since a furnace is in a high temperature condition by using heaters in the preliminary heating zone and the main heating zone, a chain having bushes is used as the conveyance device that travels in these zones wherein the chain has heat resistance and heat strength in high temperature under the high temperature environment. The chain having the bushes is provided in the main body of the reflow device and travels within the main body of the reflow device to convey the board by a rotation of a sprocket to which a rotation force of a driving motor (not shown) is transferred. In this moment, the lubrication oil having heat resistance is periodically applied to the chain having the bushes so that the chain having the bushes travels smoothly.

For example, in a method for supplying the lubricating oil, a reflow device is disclosed wherein an automatic oil supply device is provided above the chain having the bushes and the lubricating oil is supplied only to a roller portion of the chain from a position above the chain having the bushes (refer to Patent Document 1). In another method, a reflow furnace is disclosed wherein an oil supply section is provided above the chain, a space between the supply section and the chain is provided and the oil is supplied to the chain with keeping a continuous liquid level (refer to Patent Document 2). According to these methods of applying the lubricating oil, it is possible to apply stably the lubricating oil to the chain having the bushes.

DOCUMENTS FOR PRIOR ART

Patent Documents

Patent Document 1: Japanese Patent Application Publication No. Hei11-157630
Patent Document 2: Japanese Patent Application Publication No. Hei11-222310

SUMMARY OF THE INVENTION

Problems to be Solved by the Invention

However, the reflow furnaces disclosed in the above identified Patent Documents 1 and 2 have the following problems.

(1) In the reflow device disclosed in Patent Document 1, since the lubricating oil is applied directly only to the roller section of the chain having the bushes, there is a case where the lubricating oil is biased to a part of the roller section and the like, so that the lubricating oil cannot be applied evenly the whole roller section. In this case, a problem is that a stable traveling cannot be established by friction resistance between the roller section, the sprocket and the like because the lubricating oil is insufficiently supplied to the roller section.

(2) In the reflow device disclosed in Patent Document 2, since a nozzle of the supply section for supplying the lubricating oil should be adjacent to the chain having the bushes, there is a case where the lubricating oil adheres to the chain having the bushes as well as the nozzle of the supply section, the lubricating oil cannot be supplied stably and the oil supplying operation fails.

(3) The flow type soldering apparatus is an apparatus that emits the previously melted solder upward and contacts the jet surface with the printed circuit board for soldering. Since this device has a conveyance device which is similar to that of the above described reflow device, it has a similar problem. When such conveyance device is used for other equipment than the soldering apparatus, it has a similar problem.

The present invention solves the above discussed problems and has an object to provide an oil supply device for a conveyance device which can supply the lubricating oil stably to the chain.

Means for Solving the Problems

In order to solve the above described problems, the oil supply device for the conveyance device according to the present invention contains a conveyance chain; a rail section having an oil supply hole and provided above the chain for traveling the chain along a conveyance direction of a board; an oil supply section provided above the rail section for supplying oil to the chain through the oil supply hole of the rail section; and a transmission member provided between the chain and the rail section wherein the oil supply section supplies the oil dropped from the oil supply section to the chain through the transmission member.

In the present invention, when the oil is dropped from the oil supply section, the dropped oil passes through the oil supply hole formed at the rail section and dribbles down the transmission member disposed between the chain and the rail section. The oil dribbled to the transmission member is supplied to the whole of the lower chain through the surrounding area of the transmission member.

Effects of the Invention

According to the present invention, since the oil is supplied to the chain through the transmission member, the oil can be supplied stably and certainly to the chain.

EMBODIMENT FOR CARRYING OUT THE INVENTION

The following will describe the best embodiment (hereinafter referred to as an embodiment) as one example when the invention is implemented to an oil supply device for a conveyance device that is applied to a reflow device.

<1. First Embodiment>
[Configuration Example of Reflow Device]

Figure 1:
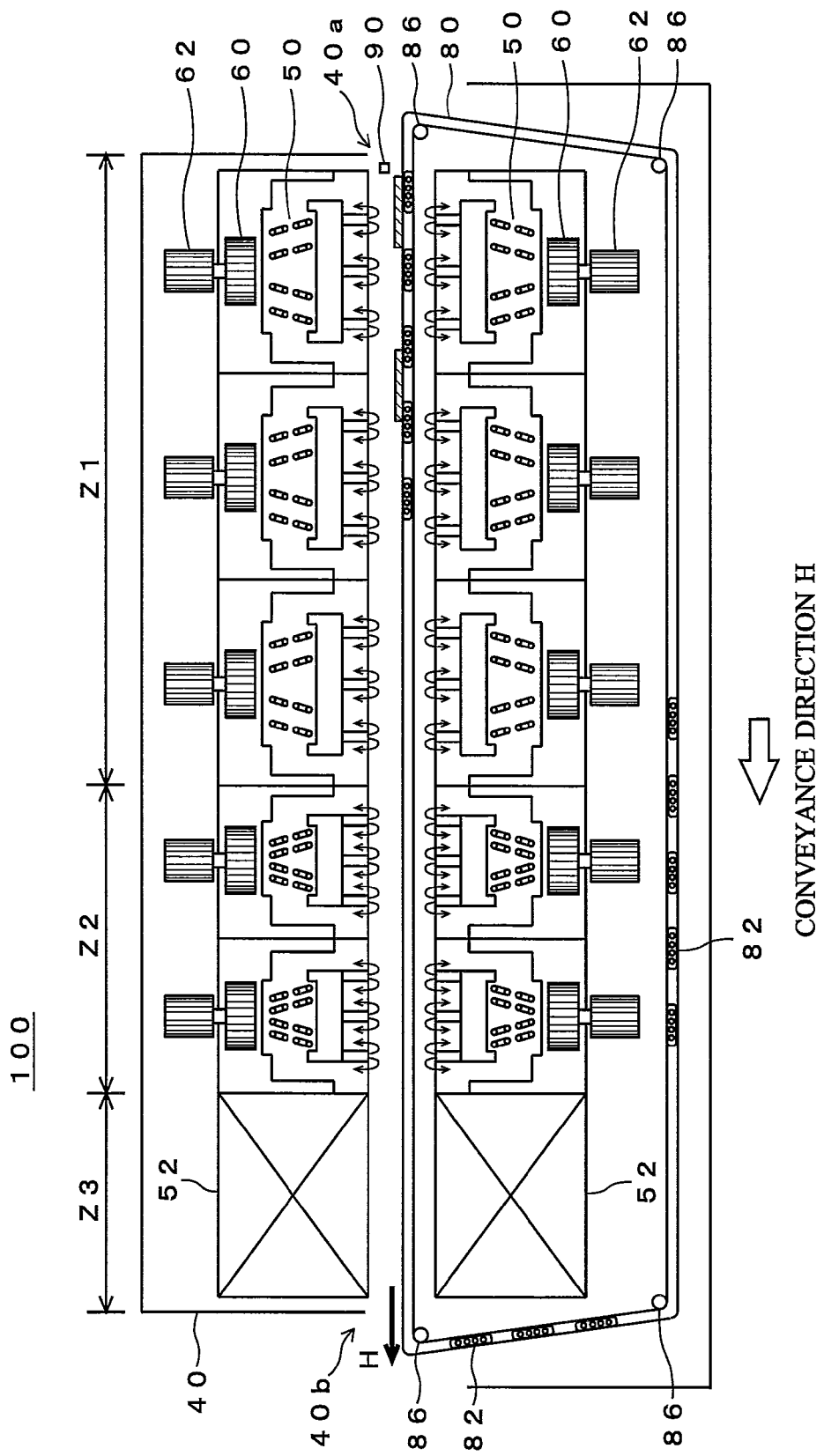
[FIG. 1] is a diagram showing a configuration example of a reflow device according to a first embodiment of the present invention.

First, a general configuration of a reflow device 100 of one embodiment according to the present invention will be described. FIG. 1 shows one example of the configuration of the reflow device 100. As shown in FIG. 1, the reflow device 100 is provided with a reflow device body 40, a conveyance device 80, an oil supply device 90, heaters 50, fans 60 and motors 62. The reflow device body 40 is a tunnel type housing having an inlet 40a and an outlet 40b. The body 40 contains a preliminary heating zone Z1, a main heating zone Z2 and a cooling zone Z3 along a conveyance path extending from the inlet 40a to the outlet 40b.

The conveyance device 80 conveys a printed circuit board 70 along the conveyance path within the reflow device body 40 and contains an endless chain 82 having bushes (hereinafter referred to as the chain 82) and sprockets 86. The chain 82 is provided so as to go around the conveyance path in the tunnel of the reflow device body 40 and the side and lower portions of the reflow device body 40 while the chain 82 is stretched by the four sprockets 86 to which the rotation force is transferred from a driving motor, not shown. The conveyance device 80 will be described hereinafter.

The oil supply device 90 is provided adjacent to the inlet 40a of the reflow device body 40 (at an upper stream side of the conveyance path) and the device 90 stabilizes the traveling of the chain 82 by supplying the lubricating oil to the traveling chain 82. The oil supply device 90 will be described hereinafter.

The heaters 50, fans 60 and motors 62 are respectively mounted in the preliminary heating zone Z1 and the main heating zone Z2 and they are positioned to face to each other in a vertical direction of the conveyance device 80. The heaters 50 generate the high temperature heated air by heating air in the reflow device body 40. The fans 60 are composed of, for example, sirocco fans and are rotated by the driving of the driving motors 62 so that the heated air heated by the heaters 50 is blown over the printed circuit board 70 from upper and lower directions. Thus, the solder on the printed circuit board 70 is melted to fix electronics parts and the like to electrodes of the printed circuit board 70. In this embodiment, the heaters 50, fans 60 and motors 60 mounted in the preliminary heating zone Z1 and the main heating zone Z2 have the identical configurations to each other.

Cooling sections 52 include, for example, cooling members, fans, motors and the like and the sections 52 are mounted in the cooling zone Z3. The cooling sections 52 cool the printed circuit boards 70 heated by the preliminary heating zone Z1 and the main heating zone Z2 in order to solidify the melted solder.

[Configuration Example of Conveyance Device]

Figure 2:
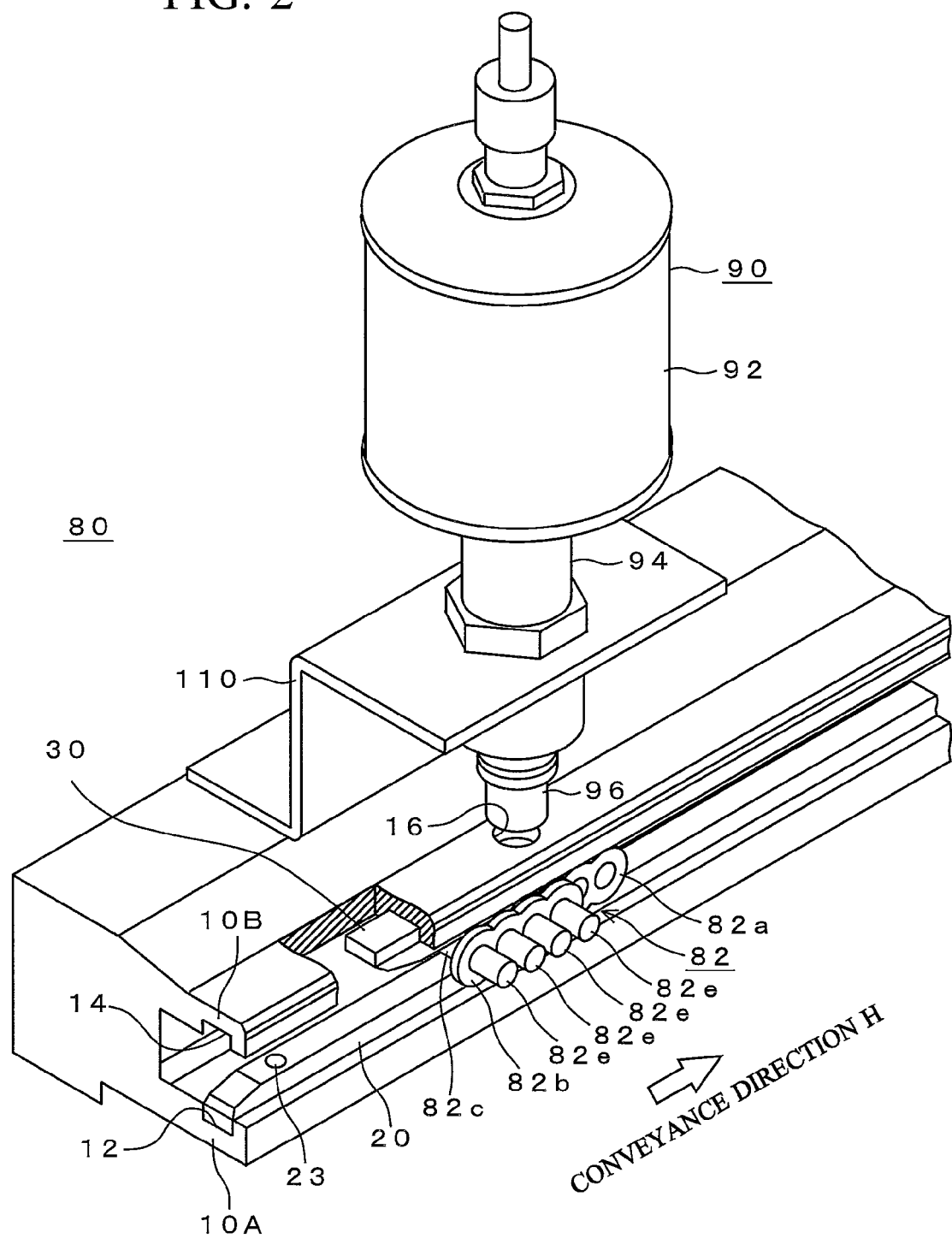
[FIG. 2] is a perspective view of an oil supply device and a conveyance device for showing a configuration example thereof.
Figure 3:
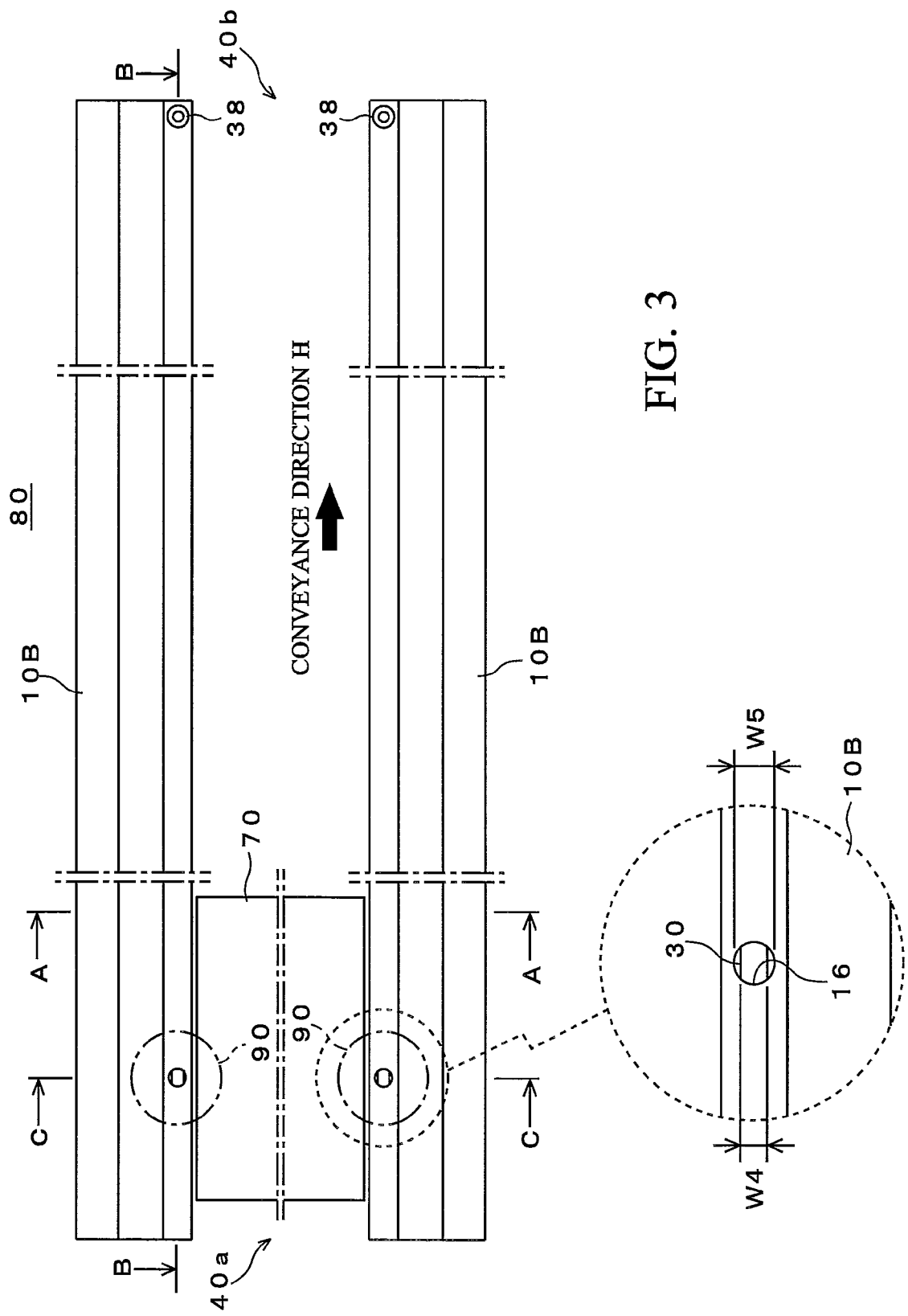
[FIG. 3] is a plane view of the oil supply device and the conveyance device for showing a configuration example thereof
Figure 4:
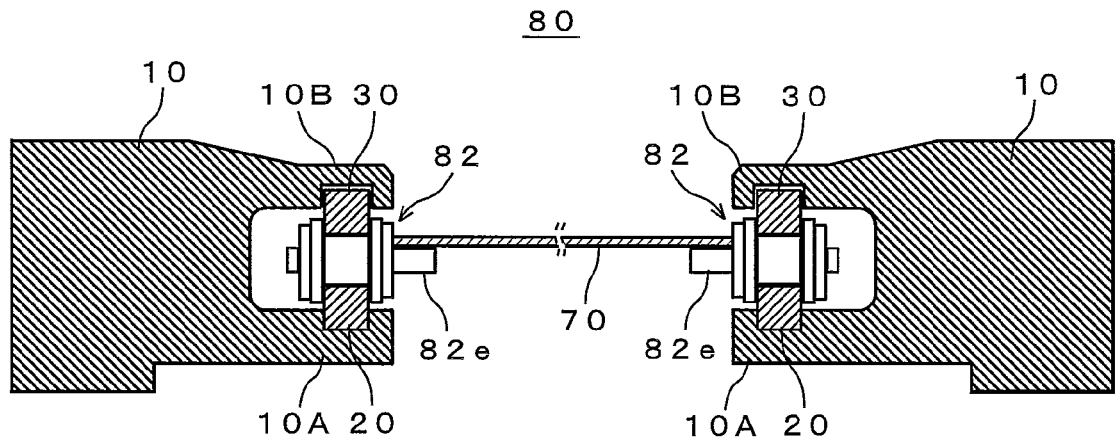
[FIG. 4] is a cross-sectional view of the oil supply device and the conveyance device, taken along lines A-A.
Figure 5:
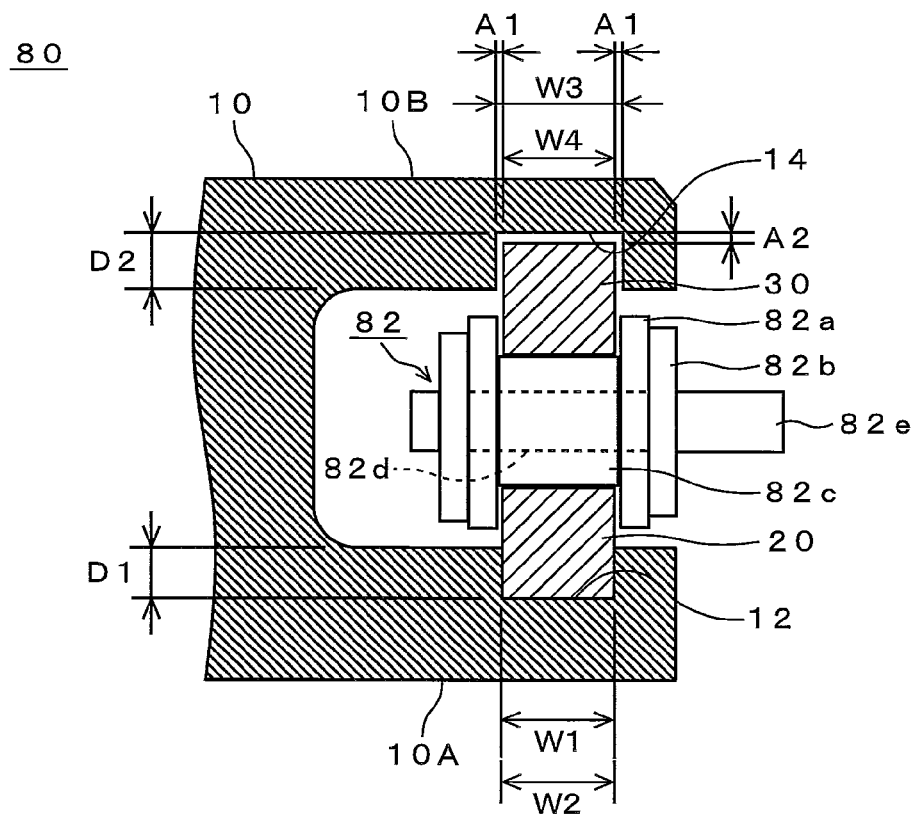
[FIG. 5] is a cross-sectional view of a main portion of the conveyance device for showing a configuration example thereof.
Figure 6:
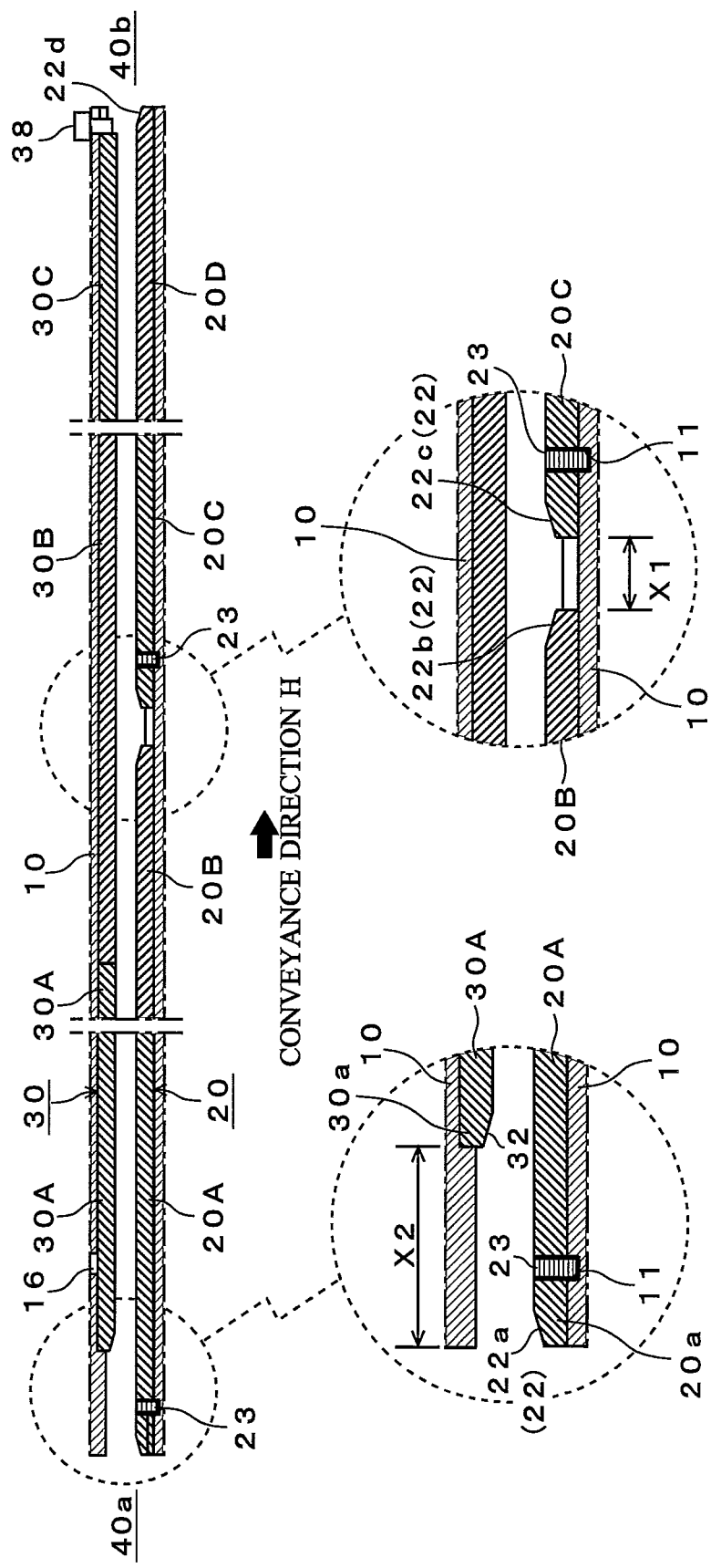
[FIG. 6] is a cross-sectional view of the oil supply device, taken along lines B-B.

The following will describe one example of a configuration of the conveyance device 80. FIG. 2 shows an example of main configurations of the conveyance device 80 and the oil supply device 90. FIG. 3 shows a plane configuration example of the conveyance device 80. FIG. 4 is a cross-sectional view of the conveyance device 80, taken along lines A-A shown in FIG. 3. FIG. 5 shows a main portion of one of conveyance rails 10. FIG. 6 is a cross-sectional view of the conveyance device 80, taken along lines B-B shown in FIG. 3.

As shown in FIGS. 2 through 6, the conveyance device 80 contains the conveyance rails 10 (rail sections), the chain 82, a lower key member 20 and an upper key member 30. As shown in FIG. 3, the conveyance rails 10 are composed of a pair of conveyance rails 10, 10 positioned in face-to-face relation in order to support both edge portions of the printed circuit board 70 in a width direction thereof. The conveyance rails 10 are mounted along a longitudinal direction (conveyance direction H) of the reflow device body 40. Each of the conveyance rails 10 is made of, for example, metal material such as aluminum. As shown in FIG. 4, the pair of conveyance rails 10, 10 is substantially U-shaped in a side view thereof and has openings at the face-to-face sides thereof. The conveyance rails has lower rails 10A which are provided under the chains 82 and upper rails 10B which are provided above the chains 82.

A groove portion 12 is formed at the inner surface of the lower rail 10A that faces the upper rail 10B along a longitudinal direction of the conveyance rail 10 in order to receive the lower key member 20. As shown in FIG. 5, a width W1 of the groove portion 12 is selected to be substantially equal to a width W1 of the lower key member 20. A depth D1 of the groove portion 12 is selected such that the lower edge of an inner plate 82a, which configures the chain 82, does not touch the inner surface of the lower rail 10A when the chain 82 is put on the upper surface of each of the lower key members 20.

In this example, each of the lower key members 20 is fixed at an upper-stream side on the conveyance path H1 for the printed circuit board 70 and its down-stream side is a free edge as shown in FIG. 6. In particular, a stopper 23 provided at the lower key member 20 is inserted into a recess 11 of the groove portion 12 to be fixed. This is because the lower key member 20 is extended to the conveyance direction when the lower key member 20 is expanded by the heat. According to this, since the travel direction of the chain 82 meets the expansion direction of the lower key member 20, the expansion of the lower key member 20 does not receive stress by the travel of the chain 82, so that the expansion of the lower key member 20 does not affect the travel of the chain 82. If the down-stream side is fixed and the upper-stream side is the free end, a vibration is generated at the lower key member 20 by the travel of the chain 82 where a base point of the vibration is a fixed side. As a result thereof, the free end of the lower key member 20 is forced so that its free end is lifted in the conveyance path and the chain has a trouble in its travel. Further, because the lower key member 20 is expanded in a direction opposite to the conveyance direction by the heat but the chain 82 travels in the conveyance direction, the lower key member 20 receives the stress in accordance with the expansion of the lower key member 20 and the lower key member 20 expands within the conveyance path. Thus, in this case, there is a possibility that the expansion of the lower key member 20 affects the travel of the chain 82.

In the inner surface of the upper rail 10B, which faces the lower rail 10A, a groove portion 14 is formed along a longitudinal direction of the conveyance rail 10 in order to receive the upper key member 30. As shown in FIG. 5, a width W3 of the groove portion 14 is selected to be slightly wider than a width W4 of the upper key member 30 and there is a gap A1 between the groove portion 14 and the upper key member 30. A depth D2 of the groove portion 14 is selected so that there are small gaps A2 each between the upper surface of the upper key member 30 and the upper groove surface of the groove portion 14 when the upper key member 30 is positioned on a bush 82c of the chain 82.

As shown in FIG. 5, the chain 82 has a pair of inner plates 82a, 82a, a pair of outer plates 82b, 82b, the bush 82c, a pin 82d and a holding pin 82e. The two inner plates 82a, 82a are coupled with each other by pressing through the bush 82c. The pin 82d is inserted into the inside of the bush 82c. The outer plates 82b, 82b are coupled with each other by pressing at the outsides of the inner plates 82a, 82a and at the both ends of the pin 82d. The holding pin 82e is used for holding the printed circuit board 70. The holding pin 82e projects from the plate surface of the outer plate 82b positioned at a side of the conveyance rails 10 that face each other. The printed circuit board 70 is put on the holding pins 82e and is conveyed in the conveyance direction H. It is to be noted that in this example, one pack of chains 82 has been shown; however, in practice, it is composed of plural inner links having the inner plates 82a and the bushes 82c and plural outer links having the outer plates 82b and the pins 82d wherein they are alternately coupled with each other.

As shown in FIGS. 2 through 6, the lower key member 20 is an elongated columnar structure that is made of metal material having good corrosion and heat resistance, such as stainless (SUS), etc. The lower key member 20 is fitted in the groove portion 12, and the upper side of the lower key member 20 is exposed from the groove portion 12 to support slidably the bush 82c in the traveling chain 82 at the upper surface of the lower key member 20. The lower key member 20 is fitted in the groove portion 12 without space and is fixed to the groove portion 12 not to move in the conveyance direction H and a direction perpendicular thereto. A width W2 of the lower key member 20 is selected to be substantially equal to a longitudinal length of the bush 82C. It is to be noted that the lower key member 20 constitutes an example of the supporting member.

As shown in FIG. 6, the lower key member 20 is composed of a plurality of separated key parts 20A, 20B, 20C and 20D. The adjacent key parts 20A, 20B, key parts 20B, 20C and key parts 20C, 20D are separated by a predetermined distance X1 and are fitted in the groove portion 12 by inserting stoppers 23 to recesses 11. Since there is a case that the lower key member 20 is extended by, for example, expansion of the lower key member 20 based on its material characteristic, it is necessary to provide small clearance between the adjacent key parts. Thus, the distance X1 is determined in accordance with the expansion coefficient or the like of the lower key member 20. It is to be noted that FIG. 6 shows an example of the separation of the adjacent key parts only by using the key parts 20B and 20C as a matter of convenience.

Taper portions 22 are provided at both ends of each key part in a longitudinal direction thereof and are downwardly tapered from its upper surface. In particular, a taper portion 22a is provided at the end of the key part 20A in a side of the inlet 40a and a taper portion 22d is provided at the end of the key part 20D in a side of the outlet 40b. These taper portions 22a and 22d act as guide for conveying the chain 82 smoothly along the inside and outside of the tunnel of the reflow device body 40. A taper portion 22b is provided at the end of the key part 20B that faces the key part 20C, and a taper portion 22c is provided at the end of the key part 20C that faces the key part 20B. These taper portions 22b and 22c act as a guide for smoothly conveying the chain 82 along the inside of the tunnel of the reflow device body 40.

The upper key member 30 is an elongated columnar structure that is made of metal material having good corrosion and heat resistance, such as stainless (SUS), etc similarly to the lower key member 20. The upper key member 30 is inserted into a space between the groove portion 14 and the chain 82 and it is put on the bushes 82c of the chain 82 by its own weight. As shown in FIG. 5, spaces A1 are provided between the peripheral surface of the upper key member 30 and the peripheral groove surface of the groove portion 14, and a space A2 is provided between the upper surface of the upper key member 30 and the upper groove surface of the groove portion 14, so that the upper key member 30 is positioned in the groove portion 14 with play. In other words, the upper key member 30 is positioned in the groove portion 14 through the spaces A1 and A2 and is movable vertically and horizontally.

As shown in FIG. 6, the upper key member 30 is composed of a plurality of separated key parts 30A, 30B and 30C. This is for mounting easily the upper key member 30 to the groove portion 14 by dividing it. The plural key parts 30A, 30B and 30C are mounted by inserting them in the space between the groove portion 14 and the chain 82 in sequence after mounting the lower key member 20 and the chain 82. A clip portion 38 is provided at the other end of the groove portion 14 in the side of the outlet 40b in order to prevent the previously inserted upper key member 30 (key part 30C) from dropping or projecting from the groove portion 14 in the side of the outlet 40b. Although in this example, the upper key members 30 have been composed of three key parts, the invention is not limited to this.

As shown in FIG. 6, a taper portion 32 is provided at the edge of the key part 30A in the side of the inlet 40a and is tapered outside upward from its lower surface. The taper portion 32 has an admission port wide for the chain 82 and functions as a guide for conveying smoothly the chain 82 to the inside of the reflow device body 40.

As shown in FIG. 6, an edge 30a of the upper key member 30 (key part 30A) at the side of the inlet 40a is disposed at a position that is shifted from the edge 20a of the lower key member 20 (key part 20A) in the side of the inlet 40a by a distance X2 to the downstream side in the conveyance direction H. This is because, if the edge 20a of the key part 20A and the edge 30a of the key part 30A are set at the same position, an admission port between the key part 20A and the key part 30A becomes narrow and in this case, there is a possibility that the chain 82 conveyed from the inlet 40a touches and bites the key parts 20A and 30A and the chain 82 stops traveling. Since the position of the upper key member 30 (key part 30A) is shifted from the position of the lower key member 20 (key part 20A), the admission port becomes wide. Moreover, after the chain 82 conveyed from the inlet 40a is guided by the lower key member 20, the upper key member 30 guides the chain 82. Therefore, the chain 82 can be prevented from biting and the chain 82 can be stably traveled.

[Configuration Example of Oil Supply Device and Conveyance Device]

Figure 7:
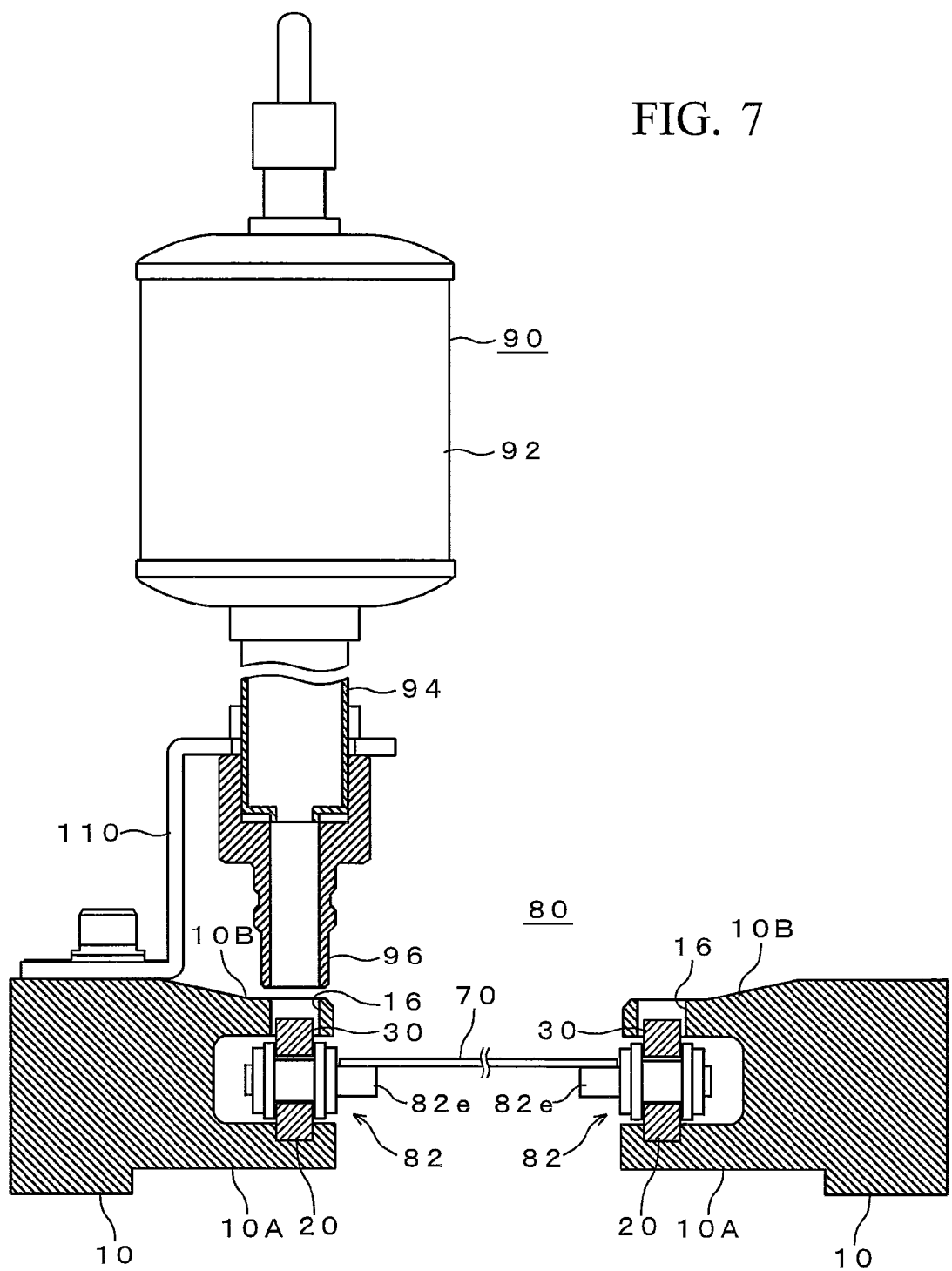
[FIG. 7] is a cross-sectional view of the oil supply device and the conveyance device, taken along lines C-C.
Figure 8:
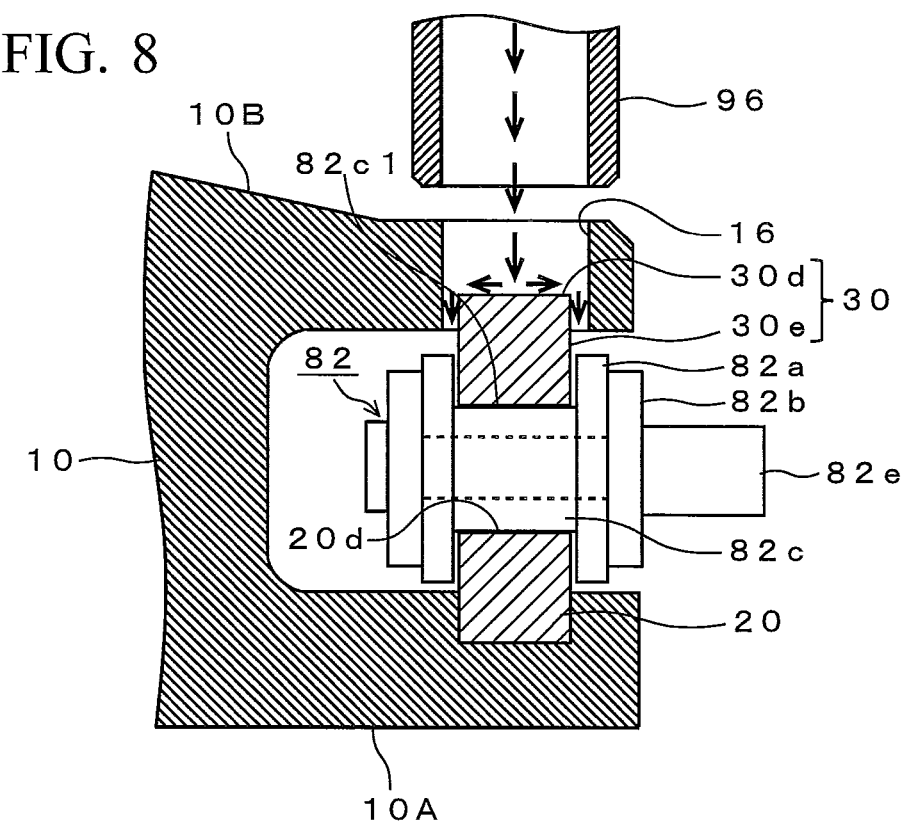
[FIG. 8] is a cross-sectional view of main portions of the oil supply device and the conveyance device (Part one) for showing a configuration example thereof.
Figure 9:
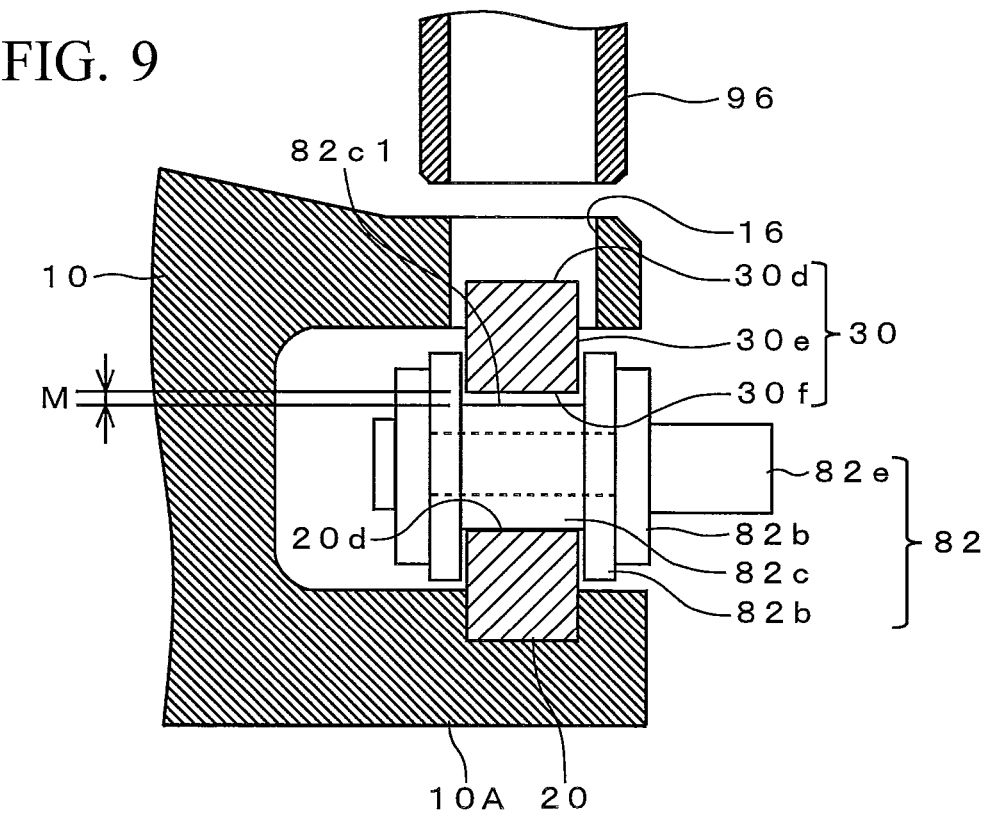
[FIG. 9] is a cross-sectional view of the main portions of the oil supply device and the conveyance device (Part two) for showing a configuration example thereof.

FIG. 7 shows a cross-sectional view of the oil supply device 90 and the conveyance device 80 of FIG. 3, taken along lines C-C and FIG. 8 shows a main section thereof. FIG. 9 shows an operation example of the upper key member 30 that moves vertically in response to vibration of the chain 82. In the configuration of FIG. 7, the elements same as ones shown in FIGS. 4 and 5 will be omitted. FIG. 7 shows an example where the oil supply device 90 is mounted at one of the conveyance rails 10 for the sake of convenience.

As shown in FIGS. 1, 7 and 8, the oil supply device 90 is mounted at an upper position of the upper rail 10B and at the end of the upper rail 10B in the inlet 40a side, and it supplies the lubricating oil to the chain 82 through the upper key member 30. The oil supply devices 90 are respectively mounted at two conveyance rails 10. Here, it is because temperature of the furnace is high during the operation of the reflow device 100 and the supplied lubricating oil volatilizes during the travel of the chain 82 so that the lubrication oil has to be supplied to the chain 82 before the chain 82 travels in the furnace to mount the oil supply device 90 at the end of the conveyance rail 90 in the inlet 40a side.

As shown in FIG. 7, the oil supply device 90 is provided with a reservoir 92, a pipe 94 and a nozzle 96. The reservoir 92 has a cylinder having closed upper and lower portions and it receives a predetermined amount of the lubrication oil therein to stabilize the travel of the chain 82. One end of pipe 94 is communicated to the lower end of the reservoir 92 and the other end thereof is communicated to the upper end of the nozzle 96. The pipe is mounted at the upper surface of the upper rail 10B via a mounting metal plate 110. The nozzle 96 is provided above an oil supply hole 16 of the upper rail 10B, which will be described hereinafter, wherein the tip of the nozzle is slightly separated from the oil supply hole 16. An inner diameter of the nozzle 96 is selected to be substantially equal to a hole diameter of the oil supply hole 16 in this example. The nozzle 96 drops the lubrication oil supplied from the reservoir 92 to the upper surface 30d of the upper key member 30 via the oil supply hole 16 of the upper rail 10B (refer to FIG. 8).

As shown in FIGS. 3 and 7, the oil supply hole 16 having a circle shape in a plan view is formed at the upper rail 10B directly under the nozzle 96 of the oil supply device 90. The oil supply hole 16 passes through the upper rail 10B in a direction (thickness direction) perpendicular to its longitudinal direction and its lower end is communicated to the groove portion 14 formed at the upper rail 10B (refer to FIGS. 5 and 8). The lubricating oil from the oil supply device 90 is dropped to the upper key member 30 positioned in the groove portion 14. As shown in FIG. 3, a hole diameter W5 of the oil supply hole 16 is selected to be slightly larger than the width W4 of the upper key member 30 so that the lubricating oil from the oil supply device 90 can be smoothly and certainly dropped.

As shown in FIG. 8, the upper key member 30 is positioned in the groove portion 14 and the upper side thereof is inserted into the oil supply hole 16. In addition, the upper key member 30 acts as a transmission member for receiving at its upper surface 30d the lubrication oil from the oil supply device 90 and for supplying the received lubrication oil from the upper surface 30d of the upper key member 30 along the side surfaces 30e to the bush 82c of the chain 82 at the lower surface side of the upper key member 30. On the other hand, the lower key member 20 acts as a holding member for receiving at its upper surface 20d the lubrication oil flowed down from the upper circular surface 82c1 of the bush 82c of the chain 82 and for holding the lubrication oil.

[Operation Example of Supplying Lubrication Oil to Chain]

The following will describe an example of the flow of the lubrication oil in a case of supplying the lubrication oil to the chain 82 with reference to FIGS. 7 through 9. As shown in FIGS. 7 and 8, when the lubrication oil is dropped from the nozzle 96 of the oil supply device 90, the dropped lubrication oil flows to the upper surface 30d of the upper key member 30 through the oil supply hole 16 of the upper rail 10B. The lubrication oil dropped to the upper surface 30d of the upper key member 30 flows from the upper surface 30d of the key member 30 along its side surfaces 30e and is supplied to the end of the bush 82c of the chain 82.

Since the upper key member 30 vibrates vertically in response to a travel vibration of the chain 82, the vibration of the upper key member 30 makes a gap M between the lower surface 30f of the upper key member 30 and the upper circular surface 82c1 of the bush 82c of the chain 82 as shown in FIG. 9. The lubrication oil supplied to the edges of the bush 82c gets into a space between the upper key member 30 and the bush 82c through the gap M and wetly spreads to the whole upper circular surface 82c1 of the bush 82c. This can reduce the frictional resistance between the upper key member 30 and the chain 82 that slidably travels along the lower surface 30f of the upper key member 30.

The lubrication oil, spread wetly to the upper side of the bush 82c, flows by its weight along the circular surface of the bush 82c and drops to the upper surface 20d of the lower key member 20 and then is stored on the upper surface 20d. This can reduce the frictional resistance between the lower key member 20 and the chain 82 that travels slidably along the upper surface 20d of the lower key member 20.

[Assembling Example of Conveyance Device (Key Member)]

The following will describe an example of assembling the conveyance device 80 with reference to FIGS. 2 through 6. The lower key member 20 is first fitted in the predetermined portion of the groove portion 12 of the lower rail 10A. As described hereinbefore, the adjacent lower key members 20 and 20 are fitted in the groove portion 14 with the predetermined interval X1. Then, after the uncoupled chain 82 is provided on the upper surface 20d of the lower key member 20 by using the lower key member 20 as a guide, the chain 82 is coupled with it being stretched around four sprockets 86.

Then, the upper key member 30 is inserted from the inlet 40a to the space formed between the upper portion of the chain 82 and the groove member 14 of the conveyance rail 10. Since the upper key member 30 is divided to plural parts, they are inserted into the space in sequence. The clip portion 38 is provided at the outlet 40b side of the groove portion 14 so that the upper key member 30 is pushed until the initially inserted upper key member 30 is stopped by the clip portion 38. The conveyance device 80 can be configured as described hereinbefore.

According to the first embodiment described hereinbefore, since the lubricating oil is supplied to the chain 82 via the upper key member 30, the embodiment can apply the lubrication oil uniformly to the bush 82c of the chain 82 by comparison with a case that the lubrication oil is applied directly to the bush 82c of the chain 82. This enables the friction resistance between the chain 82 and the upper key member 30 to be reduced. This also enables the chain 82 to be traveled stably. This prevents the metal powder from being produced due to the friction between the chain 82 and the upper key member 30. Since the upper key member 30 is positioned movably in vertical between the groove portion 14 and the chain 82, the lubrication oil is applied to the entire chain 82 via the gap M that is formed by the vertical vibration during the travel of the chain 82 and small amount of the lubrication oil is enough for the chain 82 to travel stably. The nozzle 96 of the oil supply device 90 is positioned to separate from the upper surface of the upper rail 10B by the predetermined distance so that the nozzle 96 can prevent the lubrication oil from being attached thereto and it can prevent the lubrication oil from being applied unsuccessfully.

<2. Second Embodiment>

A modified example of the upper key member 30 will be discussed as the second embodiment. Since other configuration of the reflow device 100 is the same as the corresponding configuration of the first embodiment, the same elements have the same references and no detail description will be made.

Figure 10:
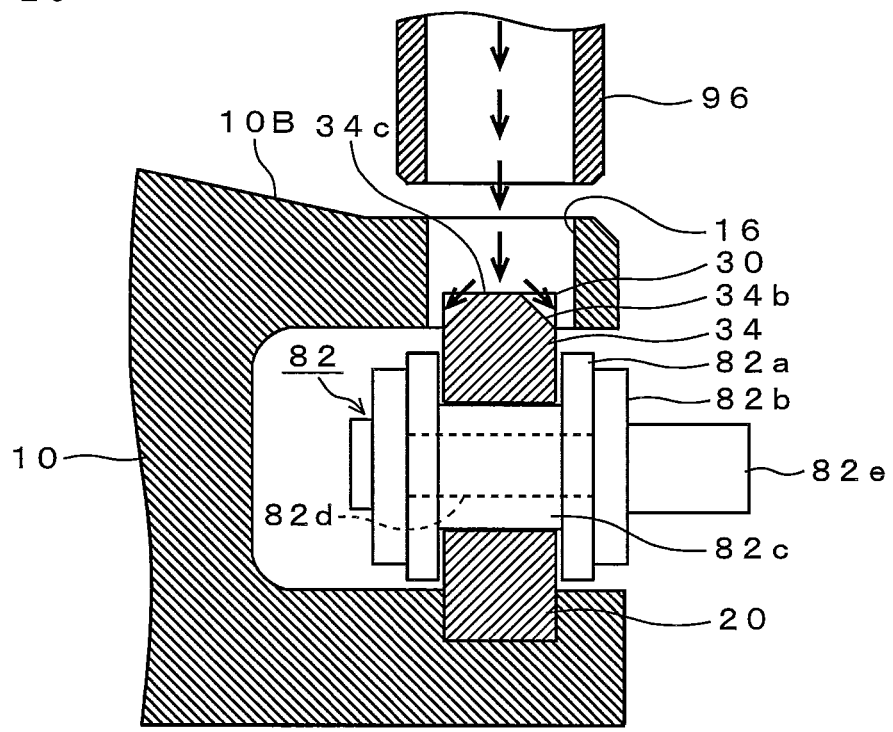
[FIG. 10] is a diagram showing a configuration example of upper key member according to a second embodiment of the present invention (Part one).

FIG. 10 shows one example of the upper key members 34 of the conveyance device 80 according to the second embodiment of the present invention. As shown in FIG. 10, a side shape of a portion of the upper key member 34 which is positioned under the oil supply hole 16 is a pyramid having a flat head and there are continuous taper portions 34b at the upper surface 34c. Since such taper portions 34b are provided, the lubricating oil dropped from the oil supply device 90 can be applied efficiently and smoothly to the bush 82c of the chain 82.

Figure 11:
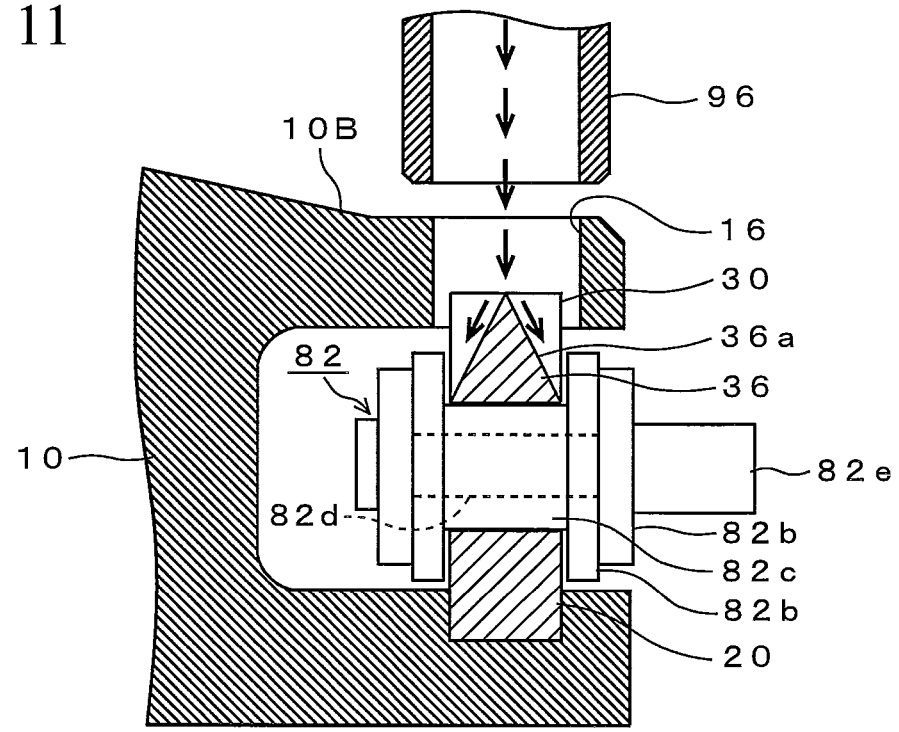
[FIG. 11] is a diagram showing a configuration example of the upper key member according to the second embodiment of the present invention (Part two).

FIG. 11 shows a configuration example construction of another upper key member 36 of the conveyance device 80 according to the second embodiment of the present invention. As shown in FIG. 11, a side shape of a portion of the upper key member 36 which is positioned under the oil supply hole 16 is a triangle and there are sloping taper portions 36a from the upper portion to the lower portion. By providing the taper portions 34a, the lubricating oil dropped from the oil supply device 90 can be applied efficiently and smoothly to the bush 82c of the chain 82.

The scope of the present invention is not limited only to the above described embodiments and includes many modifications of the above embodiments without being deviated from the subject matter of the present invention. For example, although both the upper key member 30 and the lower key member 20 have been used to apply the lubricating oil smoothly and stably to the chain 82 in the above described embodiments, the invention is not limited thereto: It may be possible to apply the lubricating oil to the chain 82 by using only the upper key member 30.

Figure 12:
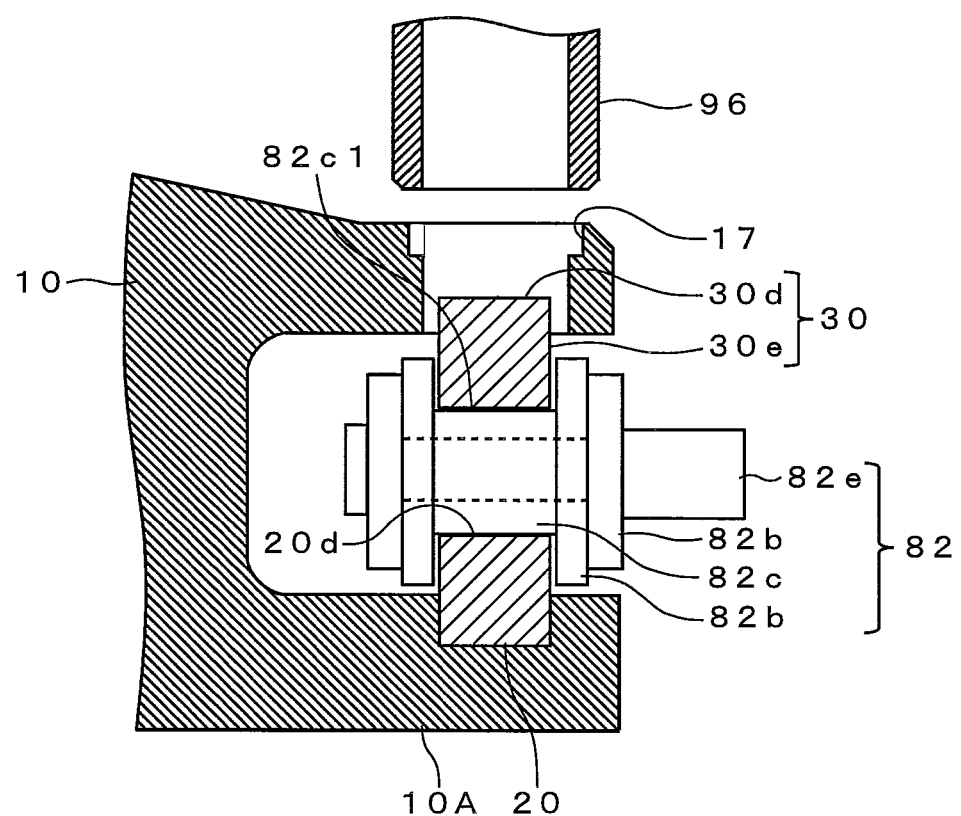
[FIG. 12] is a diagram of another configuration example of an oil supply hole (Part one).
Figure 13:
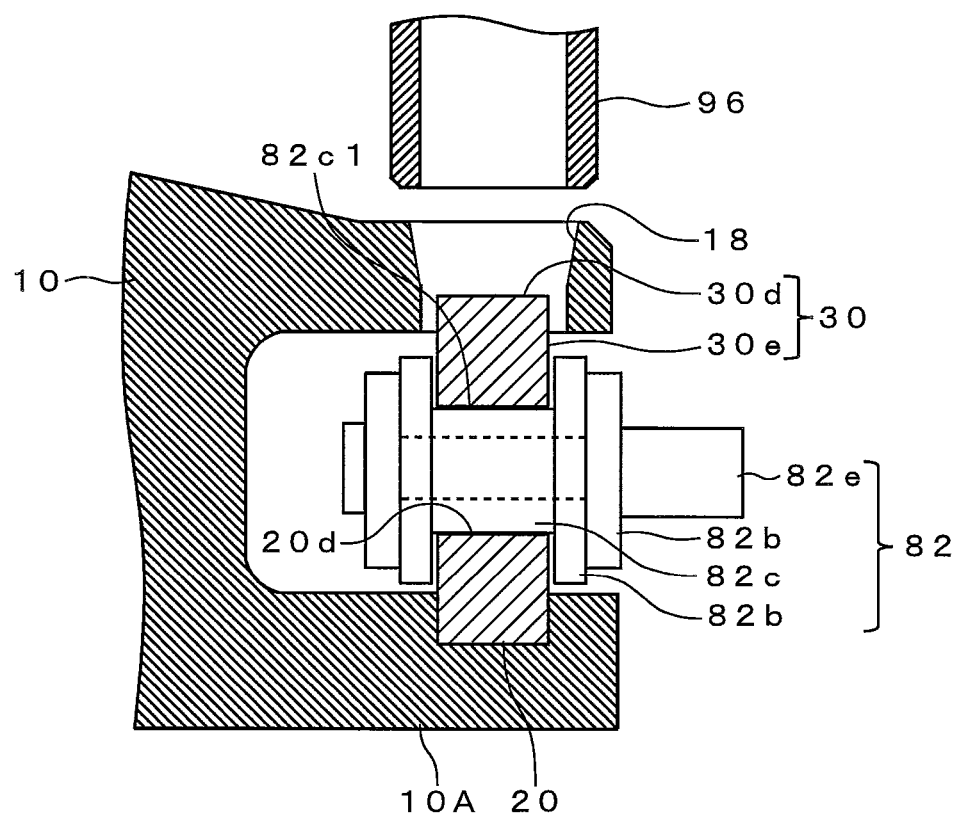
[FIG. 13] is a diagram of another configuration example of the oil supply hole (Part two).

Although the upper key member 30 is confirmed to be fitted in the groove portion 14 via the gap M in order to stabilize the travel of the chain 82 in the above embodiments, the invention is not limited thereto: The upper key member 30 may be fixed to the groove portion 14. Further, although a case where the hole diameter of the oil supply hole 16 is selected to be substantially equal to the inner diameter of the nozzle 96 has been described in the embodiment, the opening 17 may be a stair step shape as shown in FIG. 12 and the opening 18 may be a taper as shown in FIG. 13, so that the opening portion at the nozzle 96 side may be larger than the inner diameter of the nozzle 96 and the opening portion at the upper key member 30 side may be smaller than the opening portion of the nozzle 96 side as shown in FIGS. 12 and 13. This enables the lubricating oil supplied from the nozzle 96 of the oil supply device 90 to be prevented from being adhered to the upper surface of the upper rail 10B. This also enables the lubrication oil to be supplied certainly to the chain 82 through the upper key member 30.

Although the cases have been described wherein the invention is applied to the oil supply device for the conveyance device that is applied to the reflow device as one example, the present invention can be applied to a flow type soldering apparatus and similar conveyance devices.

[Explanation of References]
10: conveyance rail
10B: upper rail
14: groove portion
16: oil supply hole
20: lower key member
30: upper key member
80: conveyance device
82: chain having bushes
90: oil supply device

The invention claimed is:

1. An oil supply device for a conveyance device, comprising:
   a conveyance chain;
   a rail section having an oil supply hole and which section is located above said chain to assist traveling the chain along a conveyance direction of a board;
   an oil supply section provided above said rail section for supplying oil to said chain through said oil supply hole of said rail section; and
   a transmission member provided between said chain and said rail section;
   wherein said oil supply section supplies said oil dropped from said oil supply section to said chain through said transmission member;
   wherein said rail section comprises a groove portion at a position to which said transmission member is positioned, and
   said transmission member is movably positioned through a gap between said groove portion of said rail section and an upper portion of said chain.

2. The oil supply device for a conveyance device according to claim 1, further comprising:
   a support member for supporting a lower portion of said chain and storing said oil that is supplied from said oil supply section to said chain.

* * * * *